United States Patent [19]

Friend

[11] 4,286,316

[45] Aug. 25, 1981

[54] HIGH VOLTAGE SINE WAVE POWER SUPPLY

[75] Inventor: Clifford K. Friend, Tarzana, Calif.

[73] Assignee: Xerox Corporation, Stamford, Conn.

[21] Appl. No.: 122,168

[22] Filed: Feb. 19, 1980

[51] Int. Cl.³ .............................................. H02M 7/537
[52] U.S. Cl. .................................................... 363/131
[58] Field of Search .................................. 363/131–134

[56] References Cited

U.S. PATENT DOCUMENTS 4,178,628  12/1979  Shepard, Jr. ................... 363/134 X Primary Examiner—William M. Shoop
Attorney, Agent, or Firm—Leonard Zalman

[57] ABSTRACT

A resonant circuit sine wave power supply in which the resonant circuit thereof is coupled to ground through alternately conducting complimentary emitter followers during the portions of the voltage generation cycle when the resonant circuit is not coupled to a dc supply, whereby a power supply that is substantially non-dissipative of heat is provided.

6 Claims, 4 Drawing Figures

HIGH VOLTAGE SINE WAVE POWER SUPPLY

This invention relates to a resonant circuit sine wave power supply in which the resonant circuit thereof is coupled to ground through alternately conducting complimentary emitter followers during the portions of the voltage generation cycle when the resonant circuit is not coupled to a dc supply.

BACKGROUND OF THE INVENTION

In recent years, discorotron charging devices have been utilized for depositing charge on an adjacent surface, such as the photoreceptor of a xerographic reproduction system. Such discorotron charging devices employ a corona discharge electrode in the form of a wire coated with a relatively thick dielectric material and connected to an a.c. source of appropriate magnitude. The wire is surrounded on one side by a d.c. biased shield and on the other side by a grounded plane supporting the surface to be charged.

The electrical circuit equivalent of a discorotron charging device includes a resistor representing the corona discharge path, a capacitor, representing the dielectric material, in series with the resistor, and distributed capacitance in parallel with the series RC circuit. Due to the nature of the electrical equivalent, a low frequency square wave drive voltage applied to a dicorotron will be differentiated and therefore increased voltage will be required to achieve a desired square wave output waveform. At higher frequencies, the square wave drive voltage will produce a more square output waveform, but that waveform will contain undesirable current peaks at the voltage transitions. Another problem associated with a square wave drive voltage is that it does not permit power retrieval and hence is inefficient.

A more appropriate drive voltage for a dicorotron is a sine wave. Sine waves can be derived from resonant circuits which are efficient since they permit power retreival from reactive loads.

A classic approach to producing a sine wave power supply is to have complimentary emitter followers drive an LC network connected to the primary of an output transformer. However, the emitter follower approach is power dissipative since the emitter followers are operating in a low power dissipating mode only during the actual power input cycle. During the remainder of the power input cycle, the approximate sine wave function of the current through the inductor of the LC network must be conducted into the emitter followers. Since the emitter followers are connected conventionally to positive and negative dc supplies, the latter current conduction is transformed into heat losses. Thus, a non-dissipative sine wave power supply is desired for dicorotron charging and other devices since heat losses cannot be absorbed by the microelectronic components associated with desired high frequency operation.

SUMMARY

In accordance with the invention, a resonant circuit sine wave power supply that is substantially non-dissipative of power is provided. Specifically, switching devices coupled to the resonant circuit are alternately switched to conduction during selected portions of the power input cycle to alternately connect positive and negative dc supplies to the resonant circuit. During the remaining portions of the power input cycle, the switching devices are rendered non-conductive and complimentary emitter followers connected to the resonant circuit are alternately switched on to provide a conduction path to ground for current stored in the resonant circuit. Since the current path provided by the switching devices is non-dissipative of power, and since the current path to ground provided by the "free wheeling" complimentary emitter followers is also non-dissipative of power, power losses in the form of heat are not produced by the circuit of the invention and, thus, microelectronic circuits can be utilized.

FIGURES

DETAILED DESCRIPTION OF THE INVENTION

Figure 1:
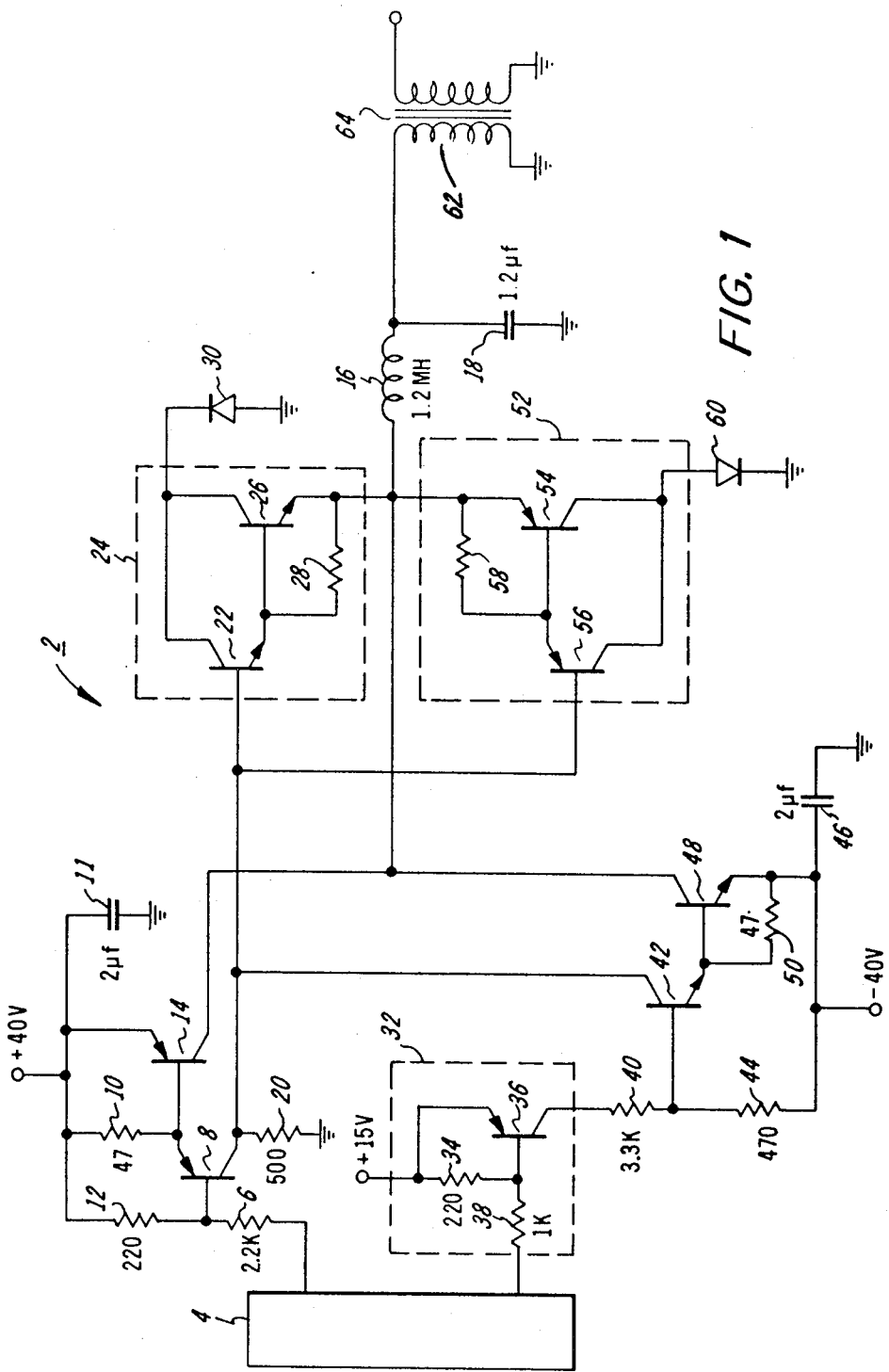
FIG. 1 is a schematic circuit diagram of a resonant circuit sine wave power supply circuit in accordance with the invention.

Referring now to FIG. 1, there is shown a schematic circuit representation of one embodiment of a power supply circuit 2 in accordance with the invention. A conventional pulse width modulator circuit 4, such as, for example, the TI TL495 or the Motorola TL495, produces rectangular pulses at two output terminals thereof, as shown by waveforms a and b of FIG. 2. Waveform a is coupled through a resistor 6 to the base of a pnp transistor 8 which has its emitter coupled via a resistor 10 to a positive dc voltage supply, indicated as being +40 volts. A resistor 12 is connected between resistors 6 and 10. Also connected to the positive dc voltage supply is a capacitor 11 and a second pnp transistor 14 which has its base connected to the emitter of transistor 8 and its collector connected directly to an inductor 16 of a parallel resonant circuit that also includes capacitor 18.

The collector of transistor 8 is connected to ground via a resistor 20 and to the base of an npn transistor 22 of an emitter follower 24 which also includes an npn transistor 26 and a resistor 28. The common collectors of emitter follower 24 are connected to ground through a diode 30.

Figure 2:
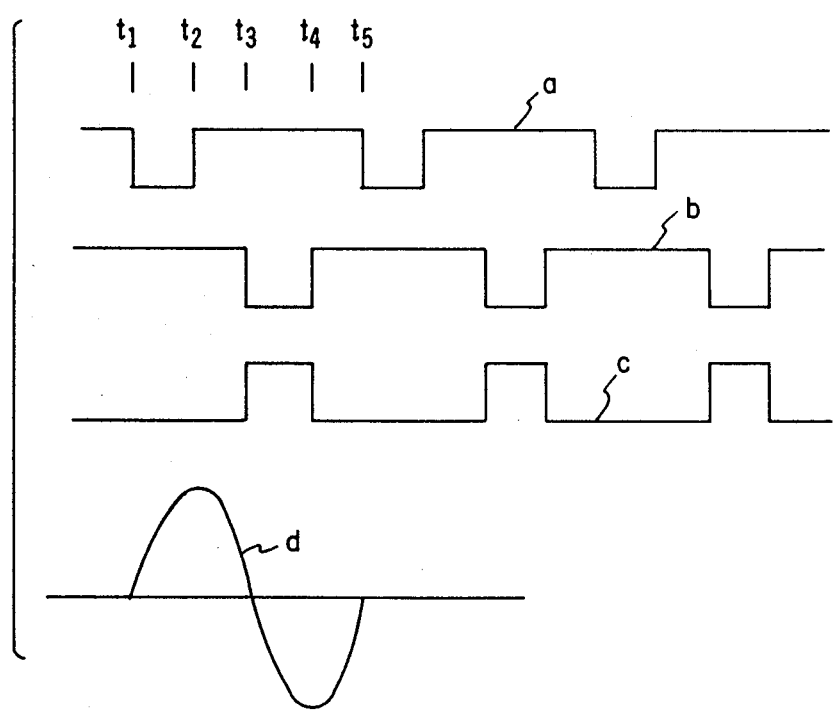
FIG. 2 depicts switching and current waveforms for the power supply of FIG. 1.

Waveform b is supplied to a voltage translator 32 comprised of transistor 36 and resistors 34 and 38. Translator 32 inverts the polarity of waveform b to provide waveform c, as shown in FIG. 2, which is supplied through a resistor 40 to the base of an npn transistor 42. A negative dc voltage supply, indicated as being −40 volts, is coupled to the base of transistor 42 via resistor 44, to ground via capacitor 46, and to the emitter of an npn transistor 48. The emitter of transistor 42 is connected directly to the base of transistor 48 and to the emitter of transistor 48 via resistor 50. The collector of transistor 42 is connected to resistor 20, and the collector of transistor 48 is connected directly to inductor 16.

Also connected to inductor 16 is a second emitter follower 52, complimentary to first emitter follower 24, comprised of transistors 54 and 56 and resistor 58 connector in an emitter follower configuration. The common collectors of transistors 54 and 56 are connected to ground via diode 60. The primary 62 of an output transformer 64 is connected to the junction of elements 16 and 18.

In operation, with waveforms a and c being supplied, transistors 8 and 14 are forward biased during time $t_1$–$t_2$, with transistors 36, 42 and 48 being back biased during time $t_1$–$t_2$. The forward bias on transistor 14 causes it to conduct which clamps the input of inductor 16 at the positive dc voltage, such that, during time $t_1$–$t_2$ the currents through inductor 16 and primary 62 change as shown by waveform d of FIG. 2. During time $t_1$–$t_2$ both emitter followers 24 and 52 are non-conducting; emitter follower 24 being non-conductive due to the positive dc voltage being applied to the emitter of transistor 26, and emitter follower 52 being non-conductive because the large voltage drop across resistor 20 applies a voltage of almost +40 volts to the base of transistor 56.

At time $t_2$, the transistors 8 and 14 lose the forward bias that had been provided by waveform a and cease conduction, whereby the input of inductor 16 is no longer clamped at the positive dc voltage. From time $t_2$–$t_3$, the energy stored in inductor 16 is dissipated to ground through a path including emitter follower 24 and diode 30, such that during time $t_2$–$t_3$ the currents through inductor 16 and primary 62 change as shown by waveform d. Emitter follower 24 and diode 30 conduct during time $t_2$–$t_3$ due to the bias provided by the EMF of coil 16.

At time $t_3$–$t_4$ the transistors 42 and 48 are forward biased to conduction, with the transistors 8 and 14 now being biased off. The forward bias on transistor 48 causes it to conduct which clamps the input of inductor 16 at the negative dc voltage, such that, during time $t_3$–$t_4$ the currents through inductor 16 and primary 62 change as shown by waveform d of FIG. 2. During time $t_3$–$t_4$, both emitter followers 24 and 52 are again non-conducting; emitter follower 52 being non-conductive due to the negative dc voltage being supplied to the emitter of transistor 54, and emitter follower 24 being non-conductive because the large voltage drop across resistor 20 applies a voltage of almost −40 volts to the base of transistor 22.

At time $t_4$, the transistors 42 and 48 lose the forward bias that had been provided by waveform c and cease conduction, whereby the input of inductor 16 is no longer clamped at the negative dc voltage. From time $t_4$–$t_5$, the energy stored in inductor 16 is dissipated to ground through a path including emitter follower 52 and diode 60, such that during time $t_4$–$t_5$ the currents through inductor 16 and primary 62 change as shown by waveform d. Emitter follower 52 and diode 60 conduct during time $t_4$–$t_5$ due to the bias provided by the EMF of coil 16. At time $t_5$, the transistors 8 and 14 are again biased to conduction and the cycle repeats.

From the foregoing, it is seen that the alternate conduction of transistors 8 and 14 and 42 and 48 provides current paths that are non-dissipative of power during times $t_1$–$t_2$ and $t_3$–$t_4$ of the input cycle, and that the "free wheeling" operation of emitter followers 24 and 52 provide current paths that are non-dissipative of power during times $t_2$–$t_3$ and $t_4$–$t_5$ of the input cycle. Accordingly, a resonant circuit sine wave power supply that is non-dissipative of energy (in the form of heat) during the entire input cycle is provided by the circuit of the invention.

During the foregoing discussion, the switching devices that provide non-dissipative current paths during times $t_2$–$t_3$ and $t_4$–$t_5$ have been specified as emitter followers. Other types of switching devices could be used instead of emitter followers, such as, for example, power FET source followers.

Figure 3:
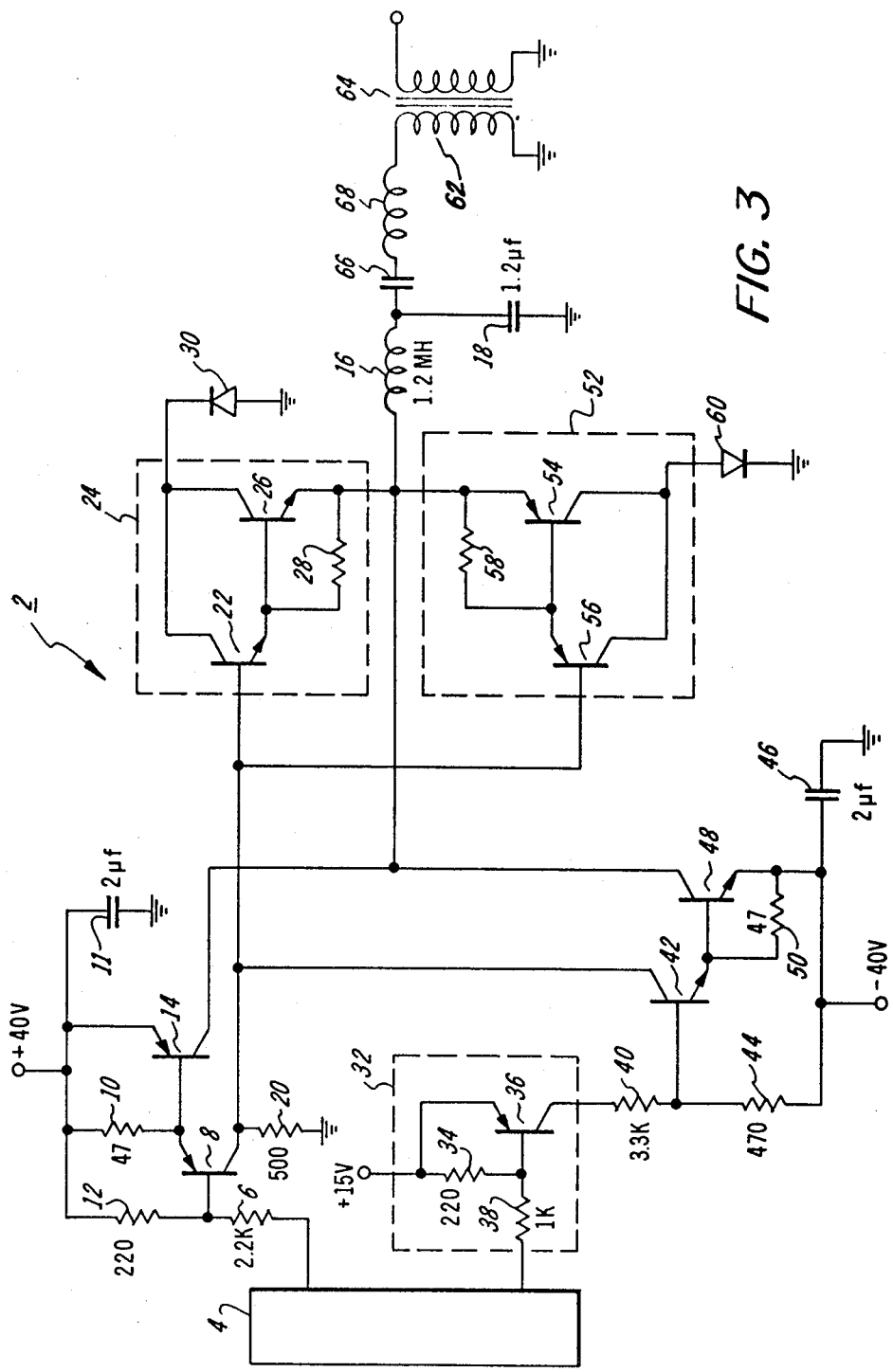
FIGS. 3 and 4 are schematic circuit diagrams of alternate embodiments of a resonant circuit sine wave power supply in accordance with the invention.

In FIG. 1, the LC parallel resonant circuit comprised of inductor 16 and capacitor 18 is connected to the primary of a transformer which would normally have some leakage reactance which causes resonance to develop at harmonics of the frequency of waveforms a and b, and those harmonics can distort the output sine wave. Such harmonics can be reduced and a clean sine wave produced by coupling, as shown in FIG. 3, a low Q series circuit (inductor 68 and capacitor 66) between the parallel resonant circuit and the transformer primary. Use of a tightly coupled output transformer wound on an E core, such as a Stackpole Carbon Co. 50-631-24B, will provide tighter coupling and less leakage reactance. As a consequence, inductor 68 can be deleted, as shown in FIG. 4, but capacitor 66 would remain to provide DC isolation of the transformer primary which makes impedance balancing less critical.

Figure 4:
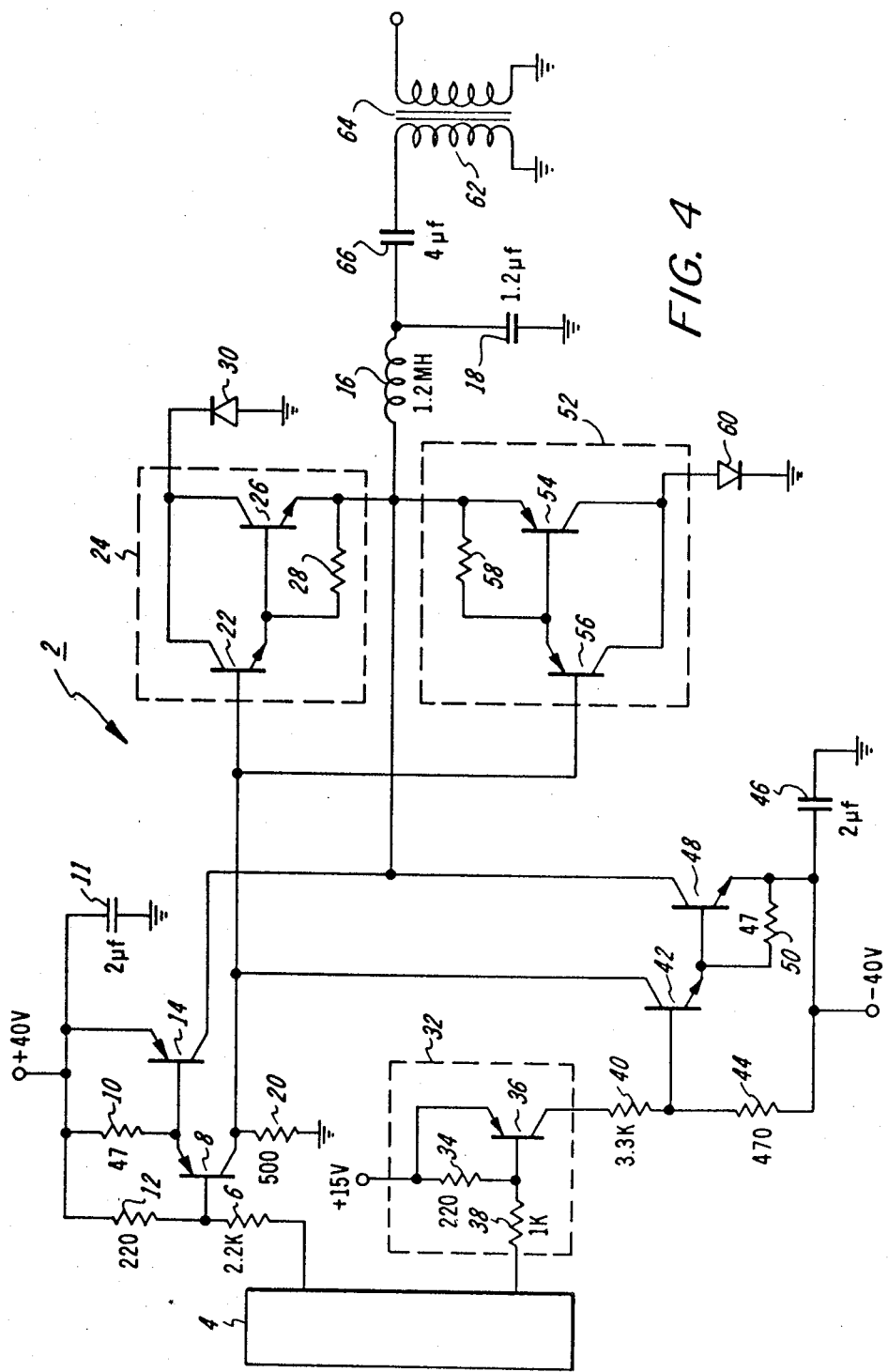

The exemplary component values shown in FIGS. 1, 3 and 4 will produce sine waves having a frequency of about 4KHz and a voltage of about 7KV, with distortion less than 5% and frequency stabilized to within 1%. Also, the circuit is non-destructive upon shorting of the output because the inductor 16 limits the current flow from the transistors to a low value in the non-resonant state.

I claim:
1. A resonant circuit sine wave power supply comprising, a transformer (64), at least one resonant circuit (16, 18) coupled to the primary (62) of transformer (64), and sources of positive and negative dc voltages, characterized in
 a first switching network (8, 14) coupled between the source of positive dc voltage and the resonant circuit (16, 18), a second switching network (42, 48) coupled between the source of negative dc voltage and the resonant circuit (16, 18), a third switching network (24) coupled between the resonant circuit (16, 18) and a reference potential, a fourth switching network (52) coupled between the resonant circuit (16, 18) and a reference potential, and switching means (a) for alternately switching the first and second switching networks to conduction during portions of the power generation cycle and (b) for alternately rendering one of the third or fourth switching networks conductive when the first and second switching networks are non-conductive, whereby non-heat dissipative current flow is provided throughout the entire power generation cycle.
2. The power supply of claim 1 in which the third and fourth switching networks are emitter followers.
3. The power supply of claim 1 in which the third and fourth switching networks are complimentary emitter followers.
4. The power supply of claim 1 in which means for providing dc current isolation is connected between the resonant circuit and the primary of the transformer.
5. The power supply of claim 4 in which the means for providing dc current isolation is a capacitor.
6. The power supply of claim 1 in which the switching means includes a resistor coupled to the first, second, third and fourth switching networks.

* * * * *